(12) United States Patent
McLeod et al.

(10) Patent No.: US 7,660,092 B2
(45) Date of Patent: Feb. 9, 2010

(54) NETWORK BUS COUPLER AND SYSTEM

(75) Inventors: David McLeod, Keller, TX (US); Rex D. Wade, Rosamond, CA (US)

(73) Assignee: Bell Helicopter Textron Inc., Hurst, TX (US)

( * ) Notice: Subject to any disclaimer, the term of this patent is extended or adjusted under 35 U.S.C. 154(b) by 63 days.

(21) Appl. No.: 10/522,906

(22) PCT Filed: Aug. 1, 2003

(86) PCT No.: PCT/US03/24211

§ 371 (c)(1),
(2), (4) Date: Nov. 21, 2005

(87) PCT Pub. No.: WO2004/013894

PCT Pub. Date: Feb. 12, 2004

(65) Prior Publication Data

US 2006/0109598 A1    May 25, 2006

(51) Int. Cl.
*H05K 7/00* (2006.01)
*H05K 5/00* (2006.01)
*G06F 13/00* (2006.01)

(52) U.S. Cl. .................. 361/110; 361/728; 361/730; 710/100

(58) Field of Classification Search .......... 361/110, 361/728, 730; 710/100
See application file for complete search history.

(56) References Cited

U.S. PATENT DOCUMENTS 4,038,601 A    7/1977    Laborie et al.
4,808,115 A *  2/1989    Norton et al. ................. 439/79
5,297,000 A    3/1994    Freige et al.
5,348,482 A    9/1994    Rudy, Jr. et al.
5,644,730 A *  7/1997    Fayfield ...................... 710/301
5,841,778 A   11/1998    Shaffer et al.
5,949,300 A *  9/1999    Olsson ........................ 333/100
6,314,481 B1  11/2001    Fehlhaber

FOREIGN PATENT DOCUMENTS

EP           297865 A2       1/1989

OTHER PUBLICATIONS

The Authoritative Dictionary of IEEE Standard Terms, 2000, IEEE Press, 7th edition, pp. 598.*
Written Opinion issued in related European application No. 03 751 824.8, Aug. 18, 2008, 7 pages.
Supplementary European Search Report issued in application No. PCT/US0324211, Jun. 5, 2008, 3 pages.

* cited by examiner

Primary Examiner—Stephen W Jackson
Assistant Examiner—Zeev Kitov
(74) Attorney, Agent, or Firm—Pillsbury Winthrop Shaw Pittman LLP

(57) ABSTRACT

A system for coupling an avionics component to a bus includes a junction box electrically coupled to the avionics component and to the bus. A circuit card disposed in the junction box includes a plurality of sockets. The some of the sockets are electrically connected to the bus. Others of the sockets are electrically connected to the avionics component. A modular network bus coupler is mountable to the circuit card. The bus coupler includes a housing with electrical isolation circuitry disposed therein. A plurality of pins are disposed exterior of the housing and engageable with at least some of the sockets of the circuit card. At least some of the pins are electrically coupled to the electrical isolation circuitry.

12 Claims, 3 Drawing Sheets

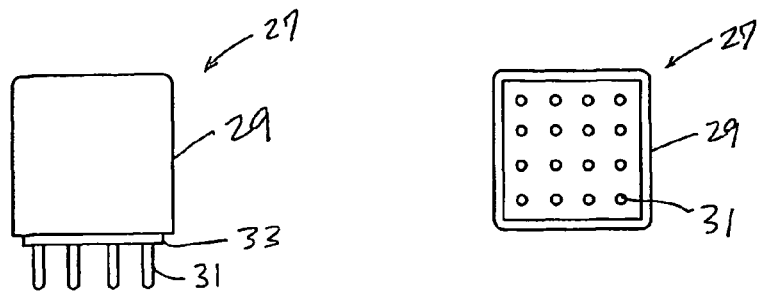
FIG. 3
FIG. 4
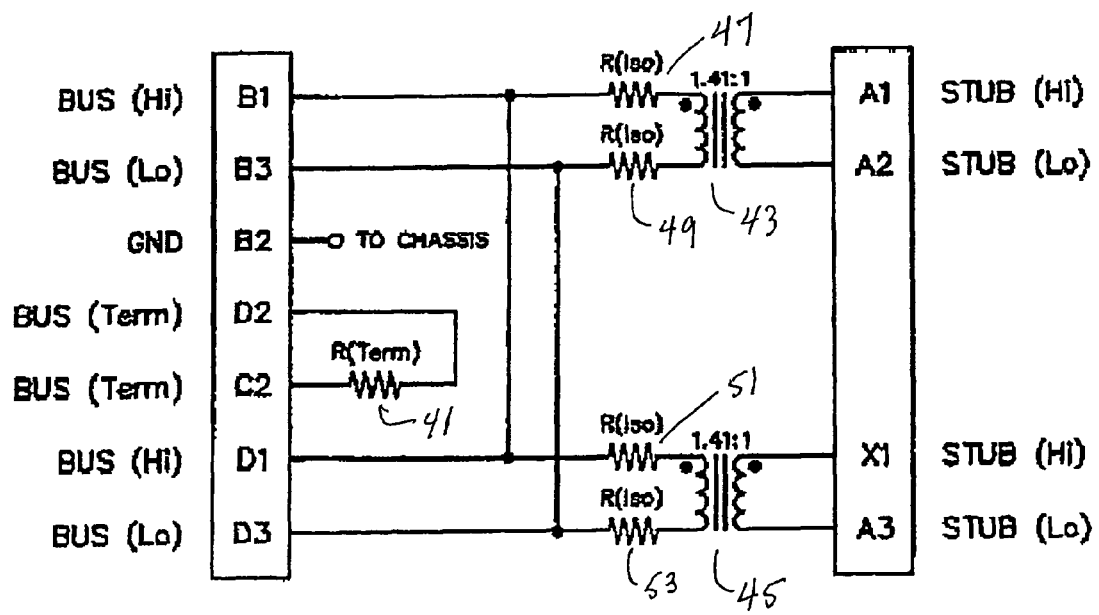
FIG. 5

NETWORK BUS COUPLER AND SYSTEM

CROSS-REFERENCE TO RELATED APPLICATION

This application is the National Phase of International Application PCT/US2003/024211 filed Aug. 1, 2003 which designated the U.S. and that International Application was published in English under PCT Article 21(2) on Feb. 12, 2004 as International Publication Number WO 2004/013894 A2. PCT/US2003/024211 claims priority to U.S. Provisional Application No. 60/400,423, filed Aug. 1, 2002. The entire contents of these applications are incorporated herein by reference, respectively.

FIELD OF THE INVENTION

The present invention relates generally to the field of electrical connectors, and more particularly to a modular network bus connector for electrically coupling devices such as avionics components to a data bus in an aircraft.

DESCRIPTION OF THE PRIOR ART

In an aircraft data management system according to Mil. Std. 1553, various avionics components, such as communications, navigation, GPS equipment and the like, communicate through a network bus. The typical Mil. Std. 1553 bus design incorporates a redundant loop of twisted, shielded wires, to which all avionics components are connected. Digital data may be shared from one avionic component to others using the loop as a path.

Avionics components are typically connected to the bus using a stub, which is a pair of wires. If the stub is spliced directly to the bus, a short in the stub will destroy the integrity of the entire network. To avoid the shorting problem, an isolation transformer may be incorporated into the stub circuit to isolate the stub from the network if a short occurs. Couplings that integrate isolation transformers and a network stub connection are well known to those skilled in the art. These couplings are spliced into the network bus.

Couplings that are connected to the network using crimped or soldered splices have several problems. For example, splices may be unreliable in an aviation environment because the constant, and frequently severe, vibration during flight tends to fatigue the splices to the point of failure.

The stubs that extend from spliced couplings are also exposed to potential damage from other environmental conditions. When a fault occurs in the network, technicians must connect a bus analyzer to a twisted, shielded pair of wires. The bus analyzer will typically indicate that one of the wires is shorted to the shield or to ground. The technicians will then wring or twist the wires in an effort to discover the location of the short. This wringing actually causes greater damage to the bus wires.

Spliced couplings are typically bulky and require an elaborate wiring harness to connect avionics to the bus. As a result, the spliced couplings require a relatively large volume of space in the aircraft. A large volume is undesirable because aircraft space and weight requirements are limited in order to maintain the desired power to weight ratio and optimize aircraft performance. Moreover, designers must expend time and effort locating mounting points for the couplers and the associated wires. The complexity of the aircraft is consequently increased, which increases production and maintenance costs.

SUMMARY OF THE INVENTION

The present invention provides a system for coupling a device to a bus. The system includes a junction box electrically coupled to the device and to the bus. A circuit card disposed in the junction box includes a plurality of sockets. Some of the sockets are electrically connected to the bus. Others of the sockets are electrically connected to the device. A modular network bus coupler is mountable to the circuit card. The bus coupler includes a housing with electrical isolation circuitry disposed therein. A plurality of pins are disposed exterior of the housing and engageable with at least some of the sockets of the circuit card. At least some of the pins are electrically coupled to the electrical isolation circuitry.

BRIEF DESCRIPTION OF THE DRAWINGS

FIG. 3 is a side view of a network coupler according to the present invention.

FIG. 4 is a bottom view of a network coupler according to the present invention.

FIG. 5 is a schematic diagram of a two stub embodiment of a network coupler according to the present invention.

DESCRIPTION OF THE PREFERRED EMBODIMENT

Figure 1:
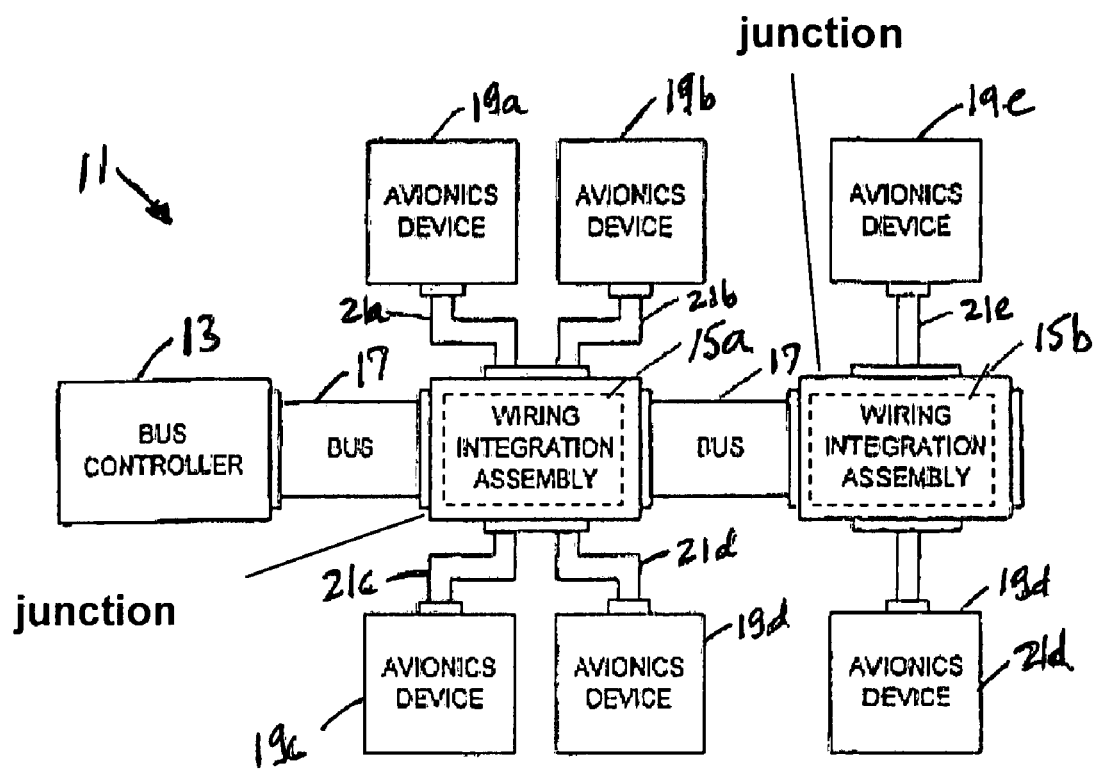
FIG. 1 is a block diagram of an aircraft integrated wiring system.

Referring now to the drawings, and first to FIG. 1, part of an aircraft integrated wiring system is designated generally by the numeral 11. Integrated wiring system 11 includes a bus controller 13 that is connected to a plurality of wiring integration assemblies 15 by a bus 17. In the preferred embodiment, bus 17 is implemented as part of a flat multi-wire assembly. Wiring integration assemblies 15 comprise junction boxes.

Avionics devices 19 are connected to wiring integration assemblies 15 by stubs 21. Avionics devices 19 may comprise navigational devices such as global positioning system devices, flight control system devices, communications devices, weapons system devices, and the like. Avionics devices 19 may share and exchange digital information through bus 17.

Figure 2:
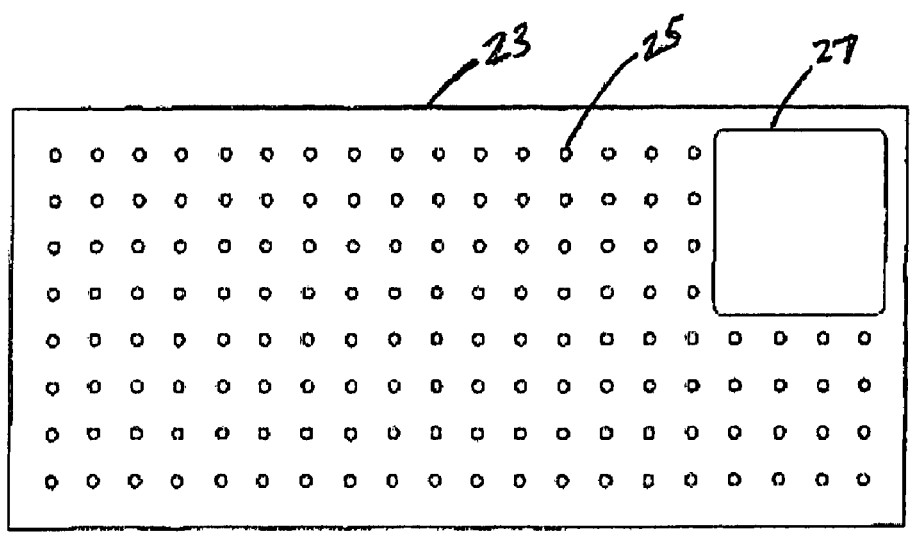
FIG. 2 is a plan view of a network coupler according to the present invention mounted to a circuit card of a wiring integration assembly.

Referring now to FIG. 2, circuit cards such as circuit card 23 are positioned within wiring integration assemblies 15. Circuit card 23 includes an array of sockets 25. Wires of bus 17 and stubs 21 are connected to appropriate sockets 25. A modular network bus coupler 27 is mounted to circuit card 23.

Referring now to FIGS. 3 and 4, bus coupler 27 includes a housing 29. Housing 29 may be made of a suitable material such as cold rolled steel. A plurality of pins 31 extend outwardly from the bottom of case 29. Pins 31 are sized and configured to be inserted into socket 25 of circuit card 23, thereby establishing an electrical connection with a socket 25. A gasket 33 of a suitable material, such as silicone rubber, may be positioned on the bottom of case 29 around pins 31. As will be explained with respect to FIGS. 5 and 6, case 29 contains electrical components that are connected to various pins 31.

Referring now to FIG. 5, there is illustrated the electrical circuitry of a two stub embodiment of the present invention. Pins B1 and D1 are adapted for connection to the high side loop of bus 17. Pins B3 and D3 are adapted for connection to the low side loop of bus 17. Pin B2 is adapted to be connected to ground. Pins D2 and C2 are adapted to be connected to the bus to provide bus termination. A termination resistor 41 positioned within case 29 is connected between pins D2 and C2.

Bus pins B1, B3, D1 and D3 are connected to isolation transformers 43 and 45 through isolation resistors 47-53. Isolation transformer 43 is connected to pins A1 and A2. Pins A1 and A2 are adapted for connection to the high side of a stub and the low side of the stub, respectively, connected to a device 19. Isolation transformer 45 is electrically connected to pins X1 and A3, which are adapted for connection to the high side of a stub and the low side of the stub, respectively, of a device.

Figure 6:
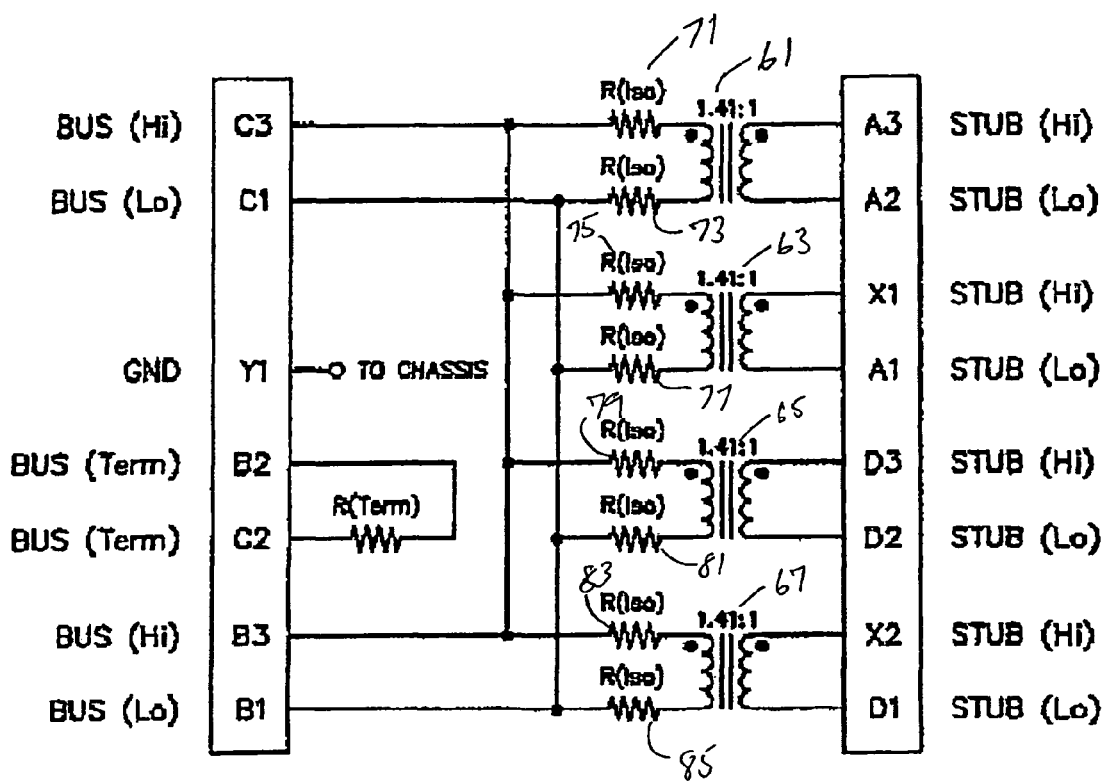
FIG. 6 is a schematic diagram of a four stub embodiment of a network coupler according to the present invention.

Referring now to FIG. 6, there is illustrated a four stub embodiment of the bus coupler of the present invention. Pins B1 and C1 are adapted for connection to the low side loop of bus 17. Pins B3 and C3 are adapted for connection to the high side loop of bus 17. Pins B1, C1, B3 and C3 are electrically connected to isolation transformers 61-67 through isolation resistors 71-85.

Isolation transformer 61 is connected to pins A2 and A3, which are adapted for connection to the low side of a stub and the high side of the stub, respectively. Similarly, pins A1 and X1 are adapted for connection to the low side of a stub and the high side of the stub, respectively. Pins D2 and D3 are adapted for connection to the low side of a stub and the high side of a stub, respectively, finally, pins D1 and X2 are adapted for connection to the low side of a stub and the high side of the stub, respectively.

From the foregoing, it may be seen that the bus coupler of the present invention overcomes many of the shortcomings of the prior art. The system of the present invention eliminates the cost and weight associated with bulky wiring harnesses. The wiring design is also simplified and the components are in easily located and accessible integrated wiring assembly junction boxes. The system of the present invention significantly reduces the time and expense associated with trouble shooting and maintenance. If a fault occurs in the wiring system, maintenance personnel may simply unplug a suspected defective bus coupler 27 and replace it with a new bus couple 27. This simple replacement procedure greatly simplifies fault repair.

While the present invention has been described with reference to preferred embodiments, this description is not intended to be construed in a limiting sense. Various modifications and combinations of elements, as well as other embodiments of the invention, will be apparent to those skilled in the art given the benefit of this description.

What is claimed is:

1. A network bus coupler mountable on a circuit card, the network bus coupler comprising:
   a housing;
   electrical isolation circuitry disposed within the housing; and,
   connectors disposed exterior of the housing and extending outwardly from the housing, the connectors being electrically coupled to the electrical isolation circuitry and configured to engage at least some sockets of the circuit card,
   wherein the network bus coupler is configured to couple a bus to a device connected to the circuit card, the bus and the circuit card disposed exterior of the housing, and
   wherein a first plurality of said connectors extending outwardly from the housing is configured to be coupled to the bus via the circuit card and a second plurality of said connectors extending outwardly from the housing is configured to be coupled to the device via the circuit card.

2. The network bus coupler as claimed in claim 1, wherein said connectors comprise a plurality of pins.

3. The network bus coupler as claimed in claim 2, wherein said pins are adapted for insertion into sockets.

4. The network bus coupler as claimed in claim 3, wherein said sockets are contained in the circuit card of a junction box.

5. The network bus coupler as claimed in claim 1, wherein said isolation circuitry includes an isolation transformer.

6. The network bus coupler as claimed in claim 1, including:
   a bus terminator disposed in said housing and electrically coupled to a connector disposed exterior of said housing.

7. A system for coupling a device to a bus, said system comprising:
   a junction box electrically coupled to said device and to said bus;
   a circuit card disposed in said junction box, said circuit card including a plurality of sockets; and,
   a modular network bus coupler mountable to said circuit card and configured to couple the bus to the device connected to the circuit card, said bus coupler comprising:
   a housing;
   electrical isolation circuitry disposed within the housing; and,
   a plurality of pins disposed exterior of the housing and extending outwardly from the housing, the plurality of pins being engageable with at least some of said sockets of said circuit card, at least some of said pins being electrically coupled to said electrical isolation circuitry,
   wherein the bus and the circuit card are disposed exterior of the housing, and
   wherein a first plurality of said pins extending outwardly from the housing is configured to be coupled to the bus via the circuit card and a second plurality of said pins extending outwardly from the housing is configured to be coupled to the device via the circuit card.

8. The system as claimed in claim 7, wherein said isolation circuitry includes an isolation transformer.

9. The system as claimed in claim 7, including:
   a bus terminator disposed in said housing and electrically coupled to a pair of said pins.

10. The system as claimed in claim 7, wherein said device is an avionics component and said bus is an aircraft data bus.

11. A network bus coupler mountable on a circuit card, the network bus coupler comprising:
   a housing configured to house essentially an electrical isolation circuitry; and,
   connectors disposed exterior of the housing and extending outwardly from the housing, the connectors being electrically coupled to the electrical isolation circuitry and configured to engage at least some sockets of the circuit card,
   wherein the network bus coupler is configured to couple a bus to a device connected to the circuit card, the bus and the circuit card disposed exterior of the housing, and
   wherein a first plurality of said connectors extending outwardly from the housing is configured to be coupled to the bus via the circuit card and a second plurality of said connectors extending outwardly from the housing is configured to be coupled to the device via the circuit card.

12. A network bus coupler mountable on a circuit card, the network bus coupler consisting essentially of:
- a housing configured to house an electrical isolation circuitry; and,
- connectors disposed exterior of the housing and extending outwardly from the housing, the connectors being electrically coupled to the electrical isolation circuitry and configured to engage at least some sockets of the circuit card, wherein the network bus coupler is configured to couple a bus to a device connected to the circuit card, the bus and the circuit card disposed exterior of the housing, and wherein a first plurality of said connectors extending outwardly from the housing is configured to be coupled to the bus via the circuit card and a second plurality of said connectors extending outwardly from the housing is configured to be coupled to the device via the circuit card.

* * * * *